(12) United States Patent
Cramer et al.

(10) Patent No.: US 7,466,401 B2
(45) Date of Patent: Dec. 16, 2008

(54) SELF-COMPENSATING LASER TRACKER

(75) Inventors: Peter G. Cramer, Kennett Square, PA (US); James K. West, Landinberg, PA (US); Robert E. Bridges, Kennett Square, PA (US)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 11/969,566

(22) Filed: Jan. 4, 2008

(65) Prior Publication Data

US 2008/0100824 A1    May 1, 2008

Related U.S. Application Data

(62) Division of application No. 10/935,459, filed on Sep. 7, 2004, now Pat. No. 7,327,446.

(60) Provisional application No. 60/500,775, filed on Sep. 5, 2003.

(51) Int. Cl.
   *G01B 11/26*    (2006.01)

(52) U.S. Cl. ..................................... 356/154

(58) Field of Classification Search .................. 356/154
   See application file for complete search history.

(56) References Cited

U.S. PATENT DOCUMENTS

| | | | |
|---|---|---|---|
| 4,621,926 A * | 11/1986 | Merry et al. ................. 356/508 |
| 4,707,129 A * | 11/1987 | Hashimoto et al. ......... 356/4.09 |
| 5,400,132 A * | 3/1995 | Trepagnier ................... 356/138 |
| 6,667,798 B1* | 12/2003 | Markendorf et al. ... 356/139.03 |
| 6,847,436 B2* | 1/2005 | Bridges ..................... 356/4.02 |
| 2003/0020895 A1* | 1/2003 | Bridges ..................... 356/4.01 |
| 2006/0066836 A1* | 3/2006 | Bridges et al. ............. 356/5.13 |

* cited by examiner

*Primary Examiner*—Roy M Punnoose
(74) *Attorney, Agent, or Firm*—Cantor Colburn LLP

(57) ABSTRACT

An apparatus and method for compensating a coordinate measurement machine is provided, which may be a laser-based coordinate measurement machine, laser tracker, or other coordinate measurement device. In one exemplary method, such compensation comprises self-compensation of payload parameters by means of embedded tracker targets. In another exemplary embodiment, such compensation comprises self-compensation of payload, azimuth-post, axis, or R0 parameters by means of embedded temperature sensors.

32 Claims, 3 Drawing Sheets

SELF-COMPENSATING LASER TRACKER

CROSS REFERENCE TO RELATED APPLICATIONS

The present application is a divisional application of U.S. patent application Ser. No. 10/935,459, filed on Sep. 7, 2004, the entire contents of which are incorporated herein by reference and priority to which is hereby claimed. The Ser. No. 10/935,459 application claims priority to U.S. Provisional Patent Application Ser. No. 60/500,775, filed Sep. 5, 2003, the entire contents of which are incorporated herein by reference, and priority to which is also hereby claimed.

BACKGROUND

The present disclosure relates to a coordinate measuring device. One set of coordinate measurement devices belongs to a class of instruments that measure the coordinates of a point by sending a laser beam to the point. The laser beam may impinge directly on the point or may impinge on a retroreflector target that is in contact with the point. In either case, the instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest. Exemplary systems for determining coordinates of a point are described by U.S. Pat. No. 4,790,651 to Brown et al. and U.S. Pat. No. 4,714,339 to Lau et al.

The laser tracker is a particular type of coordinate-measuring device that tracks the retroreflector target with one or more laser beams it emits. A device that is closely related to the laser tracker is the laser scanner. The laser scanner steps one or more laser beams to points on a diffuse surface. The laser tracker and laser scanner are both coordinate-measuring devices. It is common practice today to use the term laser tracker to also refer to laser scanner devices having distance- and angle-measuring capability. This broad definition of laser tracker, which includes laser scanners, is used throughout this application.

Compensation parameters are numerical values that are stored in software or firmware accessible to the tracker. These numerical values are applied to raw tracker data to improve tracker accuracy. Initially, the manufacturer of the tracker finds the compensation parameters by performing measurements called compensation procedures. Later, the tracker will be used at the customer's site to make measurements. Periodically, the tracker will be checked for accuracy by performing interim tests. If the accuracy is substandard, the tracker operator will perform one or more compensation procedures on the factory floor. These can take from a few minutes to an hour or more, depending on the particular tracker and on the tests that are required. In most cases, the main cause of reduced tracker accuracy is thermal drift, although mechanical shock can also be important. New methods for compensating coordinate measuring devices such as laser trackers are needed to improve accuracy and speed testing.

SUMMARY

The above-discussed and other deficiencies of the art are overcome or alleviated by the present apparatus and method for compensating a coordinate measurement machine, which may be a laser-based coordinate measurement machine, laser tracker, or other coordinate measurement device. In one exemplary method, such compensation comprises self-compensation of payload parameters by means of embedded tracker targets.

In another exemplary embodiment, such compensation comprises self-compensation of payload, azimuth-post, axis non-squareness, or R0 parameters by means of embedded temperature sensors.

Both methods may be referred to as self-compensation because they are compensation procedures that are performed without human intervention and without the need for external targets. The exemplary methods provide a fast, worry free way to maintain high tracker accuracy, even when temperature changes are large within the tracker's environment.

The above-discussed and other features and advantages of the apparatus and method for a self-compensating laser tracker will be appreciated and understood by those skilled in the art from the following detailed description and drawings.

BRIEF DESCRIPTION OF THE DRAWINGS

Referring now to the drawings, wherein like elements are numbered alike in the several FIGURES.

DETAILED DESCRIPTION OF EXEMPLARY EMBODIMENTS

Reference will now be made in detail to exemplary embodiments, examples of which are illustrated in the accompanying drawings.

Figure 1:
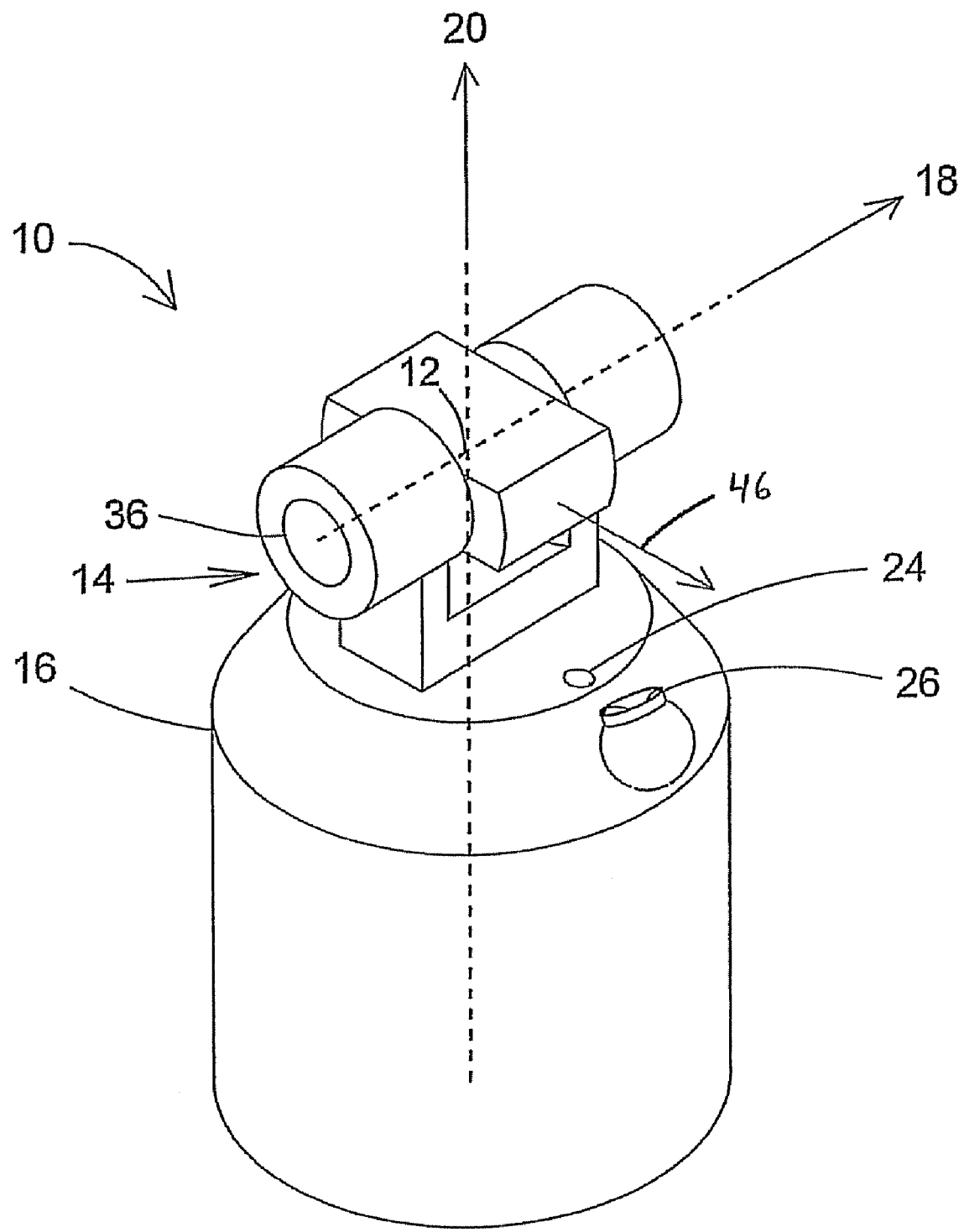
FIG. 1 illustrates a perspective view of an exemplary gimbaled beam-steering mechanism incorporating self-compensating elements.
Figure 3:
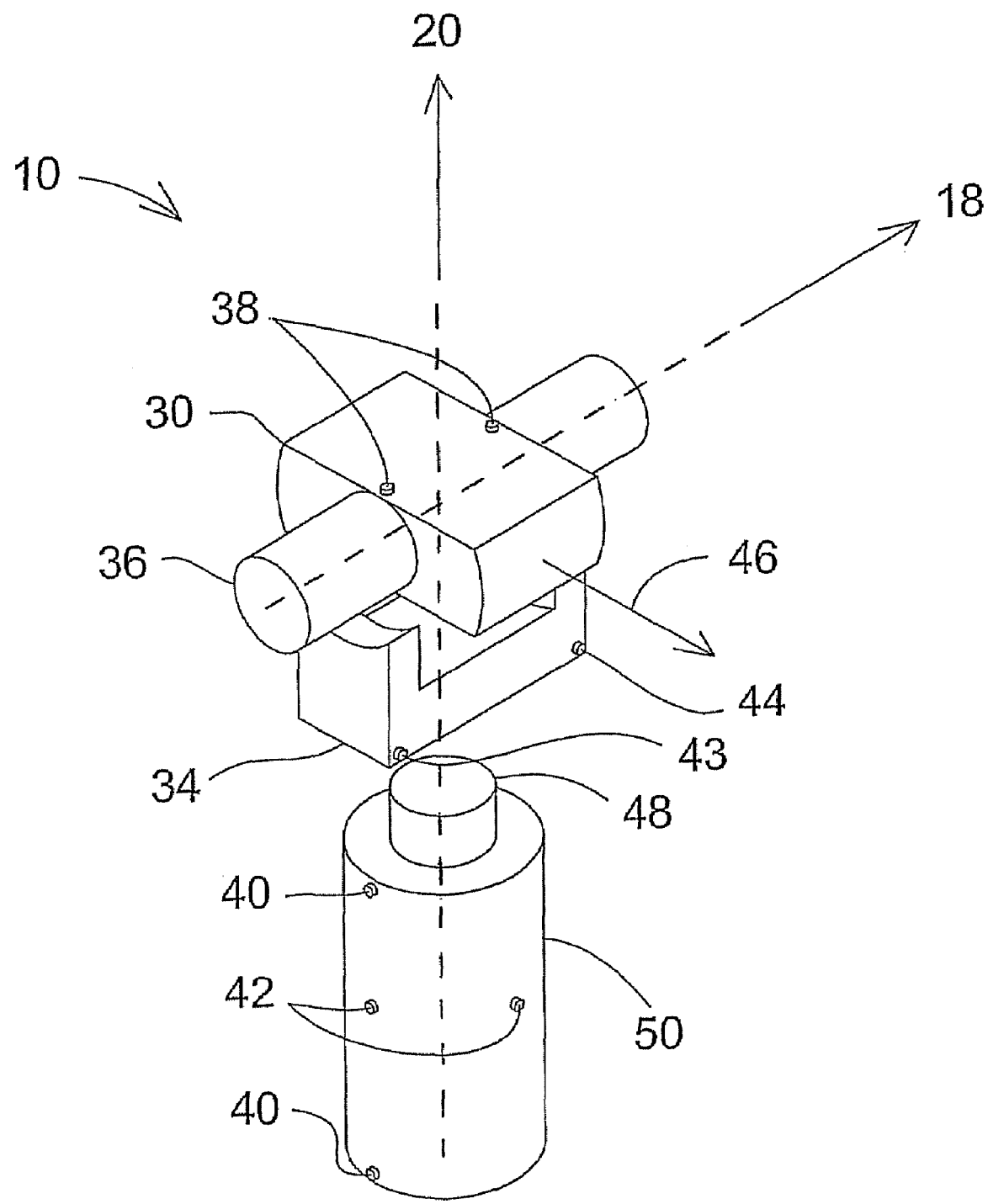
FIG. 3 illustrates a perspective view of temperature sensors placed on internal components of the exemplary gimbaled beam-steering mechanism of FIG. 1.

An exemplary gimbaled beam-steering mechanism 12 of a laser tracker 10 illustrated in FIG. 1 comprises a zenith carriage 14 that is mounted on an azimuth base 16. The zenith and azimuth mechanical axes 36, 48 internal to the tracker, as shown in FIG. 3, are turned to point the laser beam 46 in the desired direction. The zenith and azimuth mechanical axes 36, 48 are illustrated as extending at least partially along illustrated axes 18, 20, respectively. For the sake of clarity and simplicity, this sort of gimbal mechanism 12 is assumed in the following discussion. However, other types of gimbal mechanisms are possible, and the techniques described here may also be applicable to these other types.

Self-Compensation by Means of Embedded Tracker Targets

An exemplary self-compensation method provides a way to determine four payload parameters—TX, TY, RX, and RY—that describe the position and orientation of the laser beam with respect to the gimbal point of the tracker. The gimbal point is defined as the mechanical pivot point of the tracker. In an ideal tracker, the gimbal point is fixed in space, and the laser beam (or beams) passes through this point. In a real tracker, the laser beam does not pass exactly through the gimbal point but is offset slightly with respect to it. This offset, defined as the perpendicular distance from the gimbal point to the laser beam, is accounted for by the two parameters TX and TY. Here y is along the zenith axis and x is perpendicular to y and to the laser beam.

Also, in an ideal laser tracker, the laser beam is perpendicular to the zenith and azimuth mechanical axes 36, 48 when the zenith angle is set to 90 degrees. In a real laser tracker, the angular departure of the laser beam from this ideal condition is described by the RX and RY parameters. The direction of RX is along the fingers when the thumb of the right hand points in the x direction. The direction of RY is along the fingers when the thumb of the right hand points in the y direction.

Figure 2:
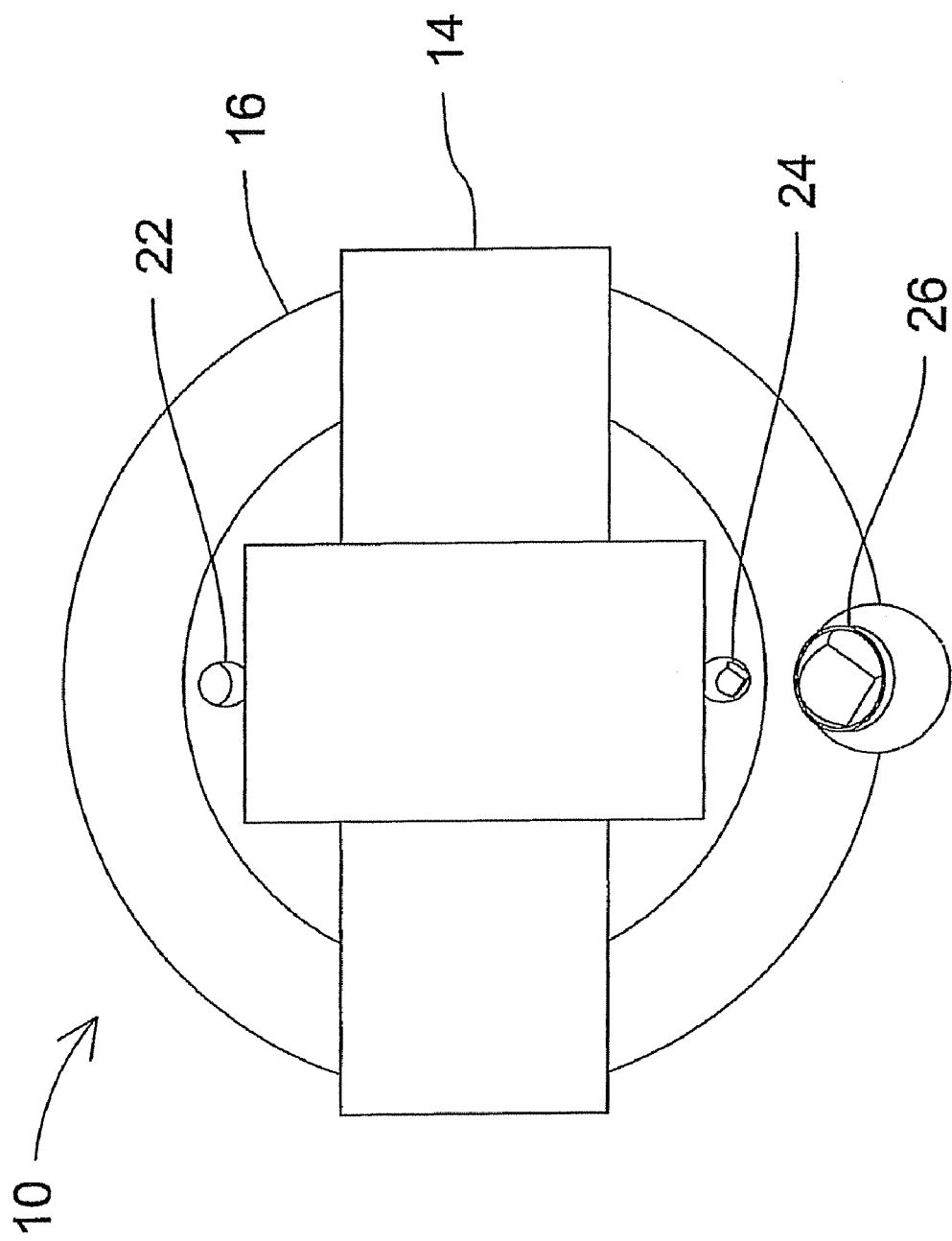
FIG. 2 illustrates a top plan view of the exemplary gimbaled beam-steering mechanism of FIG. 1.

In the current exemplary method, two embedded targets 22, 24 are placed on the azimuth base 16 of the laser tracker as shown in FIGS. 1 and 2. One of these targets 24 is a retroreflector, which may be a cube-corner, a retrosphere, or any type of device that sends the return beam back on itself. The second target 22 is a mirror, which is positioned in such a way that it can also serve as a retroreflector when the laser light is sent to the proper location on the mirror.

To determine the four parameters, measurements on each of these two targets may be performed in frontsight and backsight modes. Frontsight mode may be defined as the ordinary mode of operation of the tracker. Backsight mode may be obtained by starting in frontsight mode and then doing the following: (1) rotate the azimuth axis 20 by 180 degrees; (2) rotate the zenith axis 18 to have the negative of the original zenith angle; and (3) turn on tracking. The last step will cause the laser beam to move to the proper position on the cube-corner or mirror so that the retrace condition is established. In other words, the laser beam that passes back into the tracker follows, or retraces, the path of the outgoing laser beam. In an ideal laser tracker, the angular measurement of the embedded targets in frontsight and in backsight will be the same. In a real tracker, these angles will not be exactly the same, and the discrepancy can be used to calculate the four parameters.

For the technique described here to be applicable, two conditions must be met: (1) the mechanical structure must be stable and (2) the returning laser beam must accurately retrace the outgoing laser beam.

Referring to the first condition, the stability of the tracker structure is determined by the stability of two parameters: axis non-squareness (AXNS) and axis offset (AXOF). In an ideal tracker, the zenith mechanical axis is exactly perpendicular to the azimuth mechanical axis and the two mechanical axes are coplanar. In a real tracker, AXNS is the angular deviation from perpendicularity, and AXOF is the perpendicular distance between the two mechanical axes. For the mechanical structure to be stable, the AXNS and AXOF parameters must be stable, or at least predictable, over time.

Referring to the second condition, the accuracy of the returning laser beam will depend on the stability and proper compensation of the tracking system. Part of the returning laser light that enters the tracker splits off and strikes the position detector. The position detector gives an electrical signal that indicates where the centroid of the laser beam is located on the two-dimensional surface of the detector. If the returning laser beam exactly retraces the outgoing laser beam, it will strike a particular location, called the retrace location, on the position detector. The rest of the tracking system, which includes the angular encoders, the motors, the control electronics, and the control software, holds the laser beam near the retrace position when the tracker is in tracking mode. For the returning laser beam to accurately retrace the outgoing laser beam, the retrace location must be accurately known.

The RX and RY parameters are found by performing a backsight measurement on the embedded mirror 22. If the zenith angle in frontsight is $ZE_{FS}$ and the zenith angle in backsight is $ZE_{BS}$, then the backsight angle will approximately equal the negative of the frontsight measurement, and the sum of the two angles will be a small value, $$\Delta ZE = ZE_{BS} + ZE_{FS}. \quad (1)$$

The RY parameter is given by $$RY = -\Delta ZE/2. \quad (2)$$

If the azimuth angle in frontsight is $AZ_{FS}$ and the azimuth angle in backsight is $AZ_{BS}$, then the backsight angle will be bigger than the frontsight angle by approximately pi radians. The change in the azimuth angle is a small number, $$\Delta AZ = AZ_{BS} - \pi - AZ_{FS}. \quad (3)$$

The RX parameter is given by $$RX = \tfrac{1}{2}\sin(ZE)\cdot\Delta AZ - \cos(ZE)\cdot\sin(AXNS). \quad (4)$$

The TX and TY parameters are found by performing a backsight measurement on the embedded cube-corner. If d is the distance from the gimbal point to the embedded retroreflector, the TX and TY parameters can be found from $$TX = \tfrac{1}{2}\Delta ZE\cdot d - AXOF\cdot\cos(ZE) - d\cdot RY, \quad (5)$$

$$TY = d\cdot[\tfrac{1}{2}\Delta AZ/\sin(ZE) + RX + AXNS\cdot\cos(ZE)]. \quad (6)$$

Self-Compensation by Means of Embedded Temperature Sensors

Most of the changes in tracker parameters result from the thermal expansion or contraction of components within the tracker. In an exemplary embodiment, temperature sensors embedded at multiple locations within the laser-tracker structure monitor the temperature changes. The collected temperature data enable the compensation parameters to be adjusted in real time. Temperature related adjustments are made to the following parameters: (1) payload, (2) azimuth-post, (3) axis non-squareness, and (4) R0.

Compensation of Payload Parameters by Means of Temperature Sensors

With reference to FIG. 3, the payload 30 is the physical structure within the tracker that is rotated by the zenith mechanical axis 36. In one exemplary embodiment, one or more temperature sensors 38 embedded within the payload provide information on the temperature of components within the payload. These components include optical components such as beam splitters and lenses and mechanical components on which the optical components are mounted.

Expansions or contractions of the elements within the payload can cause a slight shifting in the four offset and angle parameters, RX, RY, TX, and TY. In a carefully constructed tracker, the slight changes in these parameters are proportional to the change in the payload temperature.

Initially the four angle parameters may be determined in either of two ways: by a pointing compensation or by a self-compensation with the embedded mirror and embedded cube-corner. The self-compensation method with the embedded mirror and cube-corner was discussed above. The pointing compensation is a measurement procedure that is carried out at the factory and that can also be carried out at the customer site, if desired. In this procedure, a spherically mounted retroreflector (SMR) 26 is measured in frontsight and backsight at a small number of locations. The spherically mounted retroreflector is a metal sphere into which a cube-corner retroreflector is mounted with the apex of the cube-corner at the center of the sphere. At the time of the compensation, the values of the parameters are recorded as $RX_0$, $RY_0$, $TX_0$, and $TY_0$ along with the initial temperature of the payload as $T_{PAYLOAD\_0}$. The temperature of the payload is measured with temperature sensors 38. Later, as the temperature of the payload changes to $T_{PAYLOAD}$, the change in payload temperature is defined as $$\Delta T_{PAYLOAD} = T_{PAYLOAD} - T_{PAYLOAD\_0}. \quad (7)$$

The values of the four parameters as corrected in real time are $$RX = RX_0 + k_{RX} \cdot \Delta T_{PAYLOAD}, \quad (8)$$

$$RY = RY_0 + k_{RY} \cdot \Delta T_{PAYLOAD}, \quad (9)$$

$$TX = TX_0 + k_{TX} \cdot \Delta T_{PAYLOAD}, \quad (10)$$

$$TY = TY_0 + k_{TY} \cdot \Delta T_{PAYLOAD}. \quad (11)$$

The proportionality constants $k_{RX}$, $k_{RY}$, $k_{TX}$, and $k_{TY}$ may be determined by placing a representative tracker within an enclosure and then varying the temperature while simultaneously measuring the embedded mirror and cube-corner targets in frontsight and backsight modes to monitor the values in RX, RY, TX, and TY. The proportionality constants are found by taking the change in parameter value divided by the change in temperature.

Compensation of Azimuth-Post Parameters by Means of Temperature Sensors

As illustrated by the exemplary tracker of FIG. 3, the tracker rotates in the azimuth direction about azimuth mechanical axis 48. This mechanical axis rotates on bearings that are mounted on the azimuth post 50. The exemplary tracker is mounted at the bottom of azimuth post 50. In one embodiment, the tracker is mounted in an upright position, so an expansion of the azimuth post causes the gimbal point to increase in height.

Temperature sensors 40, 42 attached to azimuth post 50 monitor the temperature of the post. At the start of a measurement session, the temperature of the azimuth post is $T_{AZ\_POST\_0}$. As the measurement proceeds, the change in temperature from the initial value is $$\Delta T_{AZ\_POST} = T_{AZ\_POST} - T_{AZ\_POST\_0}. \quad (12)$$

In response to the change in temperature, the height of the gimbal point will change by $$\Delta Z_{GIMBAL} = k_{AZ\_POST} \cdot \Delta T_{AZ\_POST}. \quad (13)$$

In the exemplary tracker, electronics along the side of the tracker may heat the azimuth post unevenly. In this case, temperature gradients within the azimuth post may cause the post to bend. This bending will have two effects. First, it will cause the gimbal point to move by $\Delta X_{GIMBAL}$ and $\Delta Y_{GIMBAL}$ in the plane perpendicular to azimuth axis. Note that the directions X and Y do not generally correspond to the directions x and y discussed previously. Second, the temperature gradients will cause the end of the azimuth post to change direction. The yoke 34 that supports the zenith mechanical axis is mounted on the end of the azimuth post, so the bending of the azimuth post will cause a change in the direction of the laser beam leaving the tracker. The changes in the angular directions of the end of the azimuth post are referred to as $\Delta AngX_{AZ\_POST}$ and $\Delta AngY_{AZ\_POST}$. Here $\Delta AngX_{AZ\_POST}$ and $\Delta AngY_{AZ\_POST}$ are the angular directions given by the curl of the fingers when the thumb of the right hand is pointed in the X or Y direction, respectively. The parameters associated with the bending of the azimuth post are associated with the change in temperature on the opposite sides of the azimuth post. These temperature differences can be measured by four temperature sensors 42 located every 90 degrees around the azimuth post 50. If the representative temperature differences between the two sides of the azimuth post as measured by sensors 42 in the X and Y directions are $\Delta T_{AZ\_POST\_X}$ and $\Delta T_{AZ\_POST\_Y}$, then the changes caused by post bending are given by $$\Delta X_{GIMBAL} = k_{AZ\_POST\_X\_GIMBAL} \cdot \Delta T_{AZ\_POST\_X}, \quad (14)$$

$$\Delta Y_{GIMBAL} = k_{AZ\_POST\_Y\_GIMBAL} \cdot \Delta T_{AZ\_POST\_Y}, \quad (15)$$

$$\Delta AngX_{AZ\_POST} = k_{AZ\_POST\_X\_ANGLE} \cdot \Delta T_{AZ\_POST\_Y}, \quad (16)$$

$$\Delta AngY_{AZ\_POST} = k_{AZ\_POST\_Y\_ANGLE} \cdot \Delta T_{AZ\_POST\_X}. \quad (17)$$

Note that these four quantities are in the frame of reference of the overall tracker structure, which is fixed relative to the laboratory. By contrast, the quantities TX, TY, RX, and RY are in the payload frame of reference, which rotates in the azimuth and zenith directions and is not fixed relative to the laboratory. These different compensation effects are combined by first performing a mathematical transformation from one frame of reference to the other.

The constants of proportionality in the equations (14)-(17) are found by varying the temperature of the ambient environment while the tracker makes repeated measurements of four SMR targets. All four SMRs are located in approximately the same horizontal plane. Two of the SMRs are relatively close to the tracker and have an angular separation, as measured from the tracker, of approximately 90 degrees. The other two SMRs are farther from the tracker and have the same angular separation. As the gimbal points move, the indicated position of the four targets will change. The nearer targets will be affected relatively more by the change in the direction of the end of the azimuth post and relatively less by the movement in the gimbal $\Delta X$ and $\Delta Y$ than the targets farther from the tracker. This difference in sensitivity allows the four constants of proportionality to be extracted from the equations.

Compensation of the Axis Non-Squareness Parameter by Means of Temperature Sensors Previously it was explained that in an ideal tracker the zenith mechanical axis is exactly perpendicular to the azimuth mechanical axis. In a real tracker, the angular deviation from perpendicularity is called the axis non-squareness. In calculations of target position, the effect of axis non-squareness is removed by the axis non-squareness (AXNS) parameter. In a carefully constructed laser tracker, the axis non-squareness will be stable and relatively unaffected by ambient air temperature. However, a relatively large motor may be needed to obtain fast zenith movements. This motor is mounted on the zenith mechanical axis and may generate considerable heat if rapid movements are performed for an extended period. This heat may cause a thermal expansion near one end of the azimuth axis. This can result in a movement of the zenith mechanical axis, with the result that the AXNS parameter is changed. To account for the change in the AXNS parameter in real time, temperature sensors 43, 44 monitor the temperature of the yoke 34, which is the structure that supports the zenith axis. The difference in the temperatures of sensor 43 and 44 at a given time is called $\Delta T_{ZE\_AXIS}$ and the corresponding change in the AXNS parameter is $$\Delta AXNS = k_{AXNS} \cdot \Delta T_{ZE\_AXIS}. \quad (18)$$

To find the constant of proportionality $k_{AXNS}$ in this equation, the temperature difference $T_{ZE\_AXIS}$ is monitored while the change in the AXNS parameter is also measured. If the payload parameters RX, RY, TX, and TY are accurately known, then the AXNS parameter can be easily determined by simply measuring SMRs or spherically mounted mirrors at three different zenith angles from the tracker in frontsight and backsight modes. For example, the SMRs may be placed in magnetic nests that are glued to the floor at distances of 2, 4, and 6 meters from the tracker. As discussed previously, the payload parameters can be accurately determined by means of the on-tracker mirror and cube-corner, so the three-target approach is a good one. An even more-accurate approach to determining the AXNS parameter is to construct a fixture to hold SMRs equidistant from the tracker in a semicircular pattern within a vertical plane. The targets would then be measured in frontsight and backsight modes. The advantage of this approach is that it enables calculation of the AXNS parameter independently of RX, RY, TX, and TY. However, because the AXNS parameter can be accurately determined without this special fixture, the approach that uses three floor targets is usually preferable.

A parameter that is closely related to the AXNS parameter is the AXOF parameter. As discussed previously, in an ideal tracker the azimuth and zenith mechanical axes are coplanar. In a real tracker, the AXOF is the perpendicular distance between the two mechanical axes. It is possible to compensate AXOF to account in real time for temperature changes. However, in a carefully constructed tracker, the AXOF parameter is small, perhaps 10 micrometers, and the change in the parameter is relatively insensitive to the change in temperature. For this reason, it is usually not necessary to compensate for the AXOF parameter in real time.

Compensation of the R0 Parameter by Means of Temperature Sensors

The parameter R0 is defined as the distance from the gimbal point to the home position of the tracker. The home position is located at the center of SMR 26 when the SMR is placed on the magnetic nest rigidly affixed to the tracker structure. FIGS. 1 and 2 show the SMR mounted in this magnetic nest at the home position. In the exemplary tracker, the magnetic nest is located near the lower portion of the tracker so that the angular range of the tracker is not obstructed. The value of the R0 parameter is determined at the factory, or at the customer site, by a compensation procedure. In this procedure, two magnetic nests are glued to instrument stands, and the instrument stands are adjusted so that the centers of SMRs placed within these nests are at the same height as that of the gimbal point of the tracker. First, the tracker is placed directly in line with, but outside of, the two instrument stands. The tracker measures the distance to an SMR placed in the first nest and also to an SMR placed in the second nest. The difference in distance between these two SMR locations is the true distance between the two SMRs. Next the tracker is moved in line with, but between, the two instrument stands. Again the tracker measures the distance to an SMR placed in each of the two nests. In an ideal tracker the sum of the distances as measured with the tracker between instrument stands is exactly equal to the distance measured with the tracker outside of the two instrument stands. The discrepancy between these two values is used to correct the R0 value.

At the time that the R0 compensation procedure is performed, the initial R0 value, $R0_0$, and the initial temperature representative of the path between the gimbal and home points, $T_{R0\_0}$, are recorded from at least one temperature sensor. The temperature sensor may be located in the vicinity of the home position, gimbal point, or at any other location where the recorded temperature change correlates well with the change in R0. To correct R0 in real time, the initial temperature is subtracted from the current temperature $T_{R0}$ to get the temperature difference:

$$\Delta T_{R0} = T_{R0} - T_{R0\_0}. \tag{19}$$

The change in the R0 parameter is given by $$\Delta R0 = k_{R0} \cdot \Delta T_{R0}. \tag{20}$$

The constant of proportionality $k_{R0}$ is found at the factory by placing an SMR in the home position and using the interferometer or the absolute distance meter within the tracker to monitor the change in the distance to the SMR as a function of the temperature $T_{R0}$.

While reference is made to exemplary placement of temperature sensors, it should be noted that any placement within or on the tracker effective to provide indications of temperature change relevant to the parameter to be measured are contemplated herein.

Further it will be apparent to those skilled in the art that, while exemplary embodiments have been shown and described, various modifications and variations can be made to the apparatus and method for self-compensation of a laser tracker disclosed herein without departing from the spirit or scope of the invention. Accordingly, it is to be understood that the various embodiments have been described by way of illustration and not limitation.

What is claimed is:

1. A self compensating laser tracker, comprising:
   a laser source;
   a support on which the laser source is positioned, at least a portion of the support or laser source configured to permit redirection of a laser beam emitted from the source; and
   at least one temperature sensor provided within or on said laser source or support.

2. A self compensating laser tracker in accordance with claim 1, wherein the support comprises an adjustable payload, and wherein one of said at least one temperature sensor is provided on or within said payload.

3. A self compensating laser tracker in accordance with claim 1, wherein at least a portion of the support comprises an azimuth post, and wherein one of said at least one temperature sensor is provided on or within a portion of said azimuth post.

4. A self compensating laser tracker in accordance with claim 3, wherein at least two temperature sensors are provided on or within different portions of said azimuth post.

5. A self compensating laser tracker in accordance with claim 4, wherein said at least two temperature sensors are provided at opposing sides of said azimuth post.

6. A self-compensating laser tracker in accordance with claim 1, wherein the support comprises a yoke, and wherein one of said at least one temperature sensor is provided on or within said yoke.

7. A self compensating laser tracker in accordance with claim 6, wherein at least two temperature sensors are provided on or within different portions of said yoke.

8. A self compensating laser tracker in accordance with claim 7, wherein said at least two temperature sensors are provided at opposing end portions of said yoke.

9. A self-compensating laser tracker, comprising:
   a laser source;
   a support on which the laser source is positioned, at least a portion of the support or laser source configured to permit redirection of a laser beam emitted from the source;
   at least two reflecting members provided on the support, wherein the support or laser source is configured to permit direction of the laser beam to said at least two reflecting members; and
   at least one temperature sensor provided within or on said laser source or support.

10. A self-compensating laser tracker in accordance with claim 9, wherein one of said at least two reflecting members comprises a retroreflector and a second of said at least two reflecting members comprises a mirror.

11. A method of self-compensation of a laser tracker, comprising:
    calculating or recording an angular departure or offset parameter within a first time period;
    calculating or recording temperature data from at least one temperature sensor provided within or on a portion of said laser tracker within said first time period;
    calculating or recording temperature data from said at least one temperature sensor provided within or on a portion of said laser tracker within a second time period; and
    calculating a temperature corrected value of said at least one parameter based on a comparison of temperature data from said first time period and said second time period.

12. A method of self-compensation of a laser tracker in accordance with claim 11, comprising calculating a proportionality constant for said temperature correction by varying temperature of the portion of the temperature sampled laser tracker while simultaneously measuring said at least one parameter.

13. A method of self-compensation of a laser tracker in accordance with claim 11, wherein said at least one parameter is calculated according to one of the following:

$RX=RX_0+k_{RX}\cdot\Delta T; RY=RY_0+k_{RY}\cdot\Delta T; TX=TX_0+k_{TX}\cdot\Delta T;$
$TY=TY_0+k_{TY}\cdot\Delta T,$ wherein k is said proportionality constant.

14. A method of self-compensation of a laser tracker in accordance with claim 11, wherein said at least one temperature sensor is provided within or on a portion of a laser tracker payload.

15. A method of self-compensation of a laser tracker, comprising:
    calculating or recording an azimuth post parameter within a first time period;
    calculating or recording temperature data from at least one temperature sensor provided within or on said azimuth post within said first time period;
    calculating or recording temperature data from said at least one temperature sensor provided within or on said azimuth post within a second time period; and
    calculating a temperature corrected value of said at least one parameter based on a comparison of temperature data from said first time period and said second time period.

16. A method of self-compensation of a laser tracker in accordance with claim 15, comprising calculating a proportionality constant for said temperature correction by varying temperature of the portion of the temperature sampled azimuth post while simultaneously measuring said at least one parameter.

17. A method of self-compensation of a laser tracker in accordance with claim 16, wherein said temperature corrected parameter indicates the temperature induced change of height of the gimbal point of said laser tracker according to the following:

$\Delta Z_{GIMBAL}=k_{AZ\_POST}\cdot\Delta T_{AZ\_POST}$, wherein k is the proportionality constant.

18. A method of self-compensation of a laser tracker in accordance with claim 15, wherein at least two temperature sensors are provided on different sides of said azimuth post.

19. A method of self-compensation of a laser tracker in accordance with claim 15, wherein said temperature corrected azimuth parameter indicates temperature induced movement of the gimbal point in the plane perpendicular to the azimuth axis, calculated by $\Delta X_{GIMBAL}=k_{AZ\_POST\_X\_GIMBAL}\cdot\Delta T_{AZ\_POST\_X}$ and $\Delta Y_{GIMBAL}=k_{AZ\_POST\_Y\_GIMBAL}\cdot\Delta T_{AZ\_POST\_Y}$, wherein the representative temperature differences between the two sides of the azimuth post in the X and Y directions are $\Delta T_{AZ\_POST\_X}$ and $\Delta T_{AZ\_POST\_Y}$, and wherein k is a proportionality constant.

20. A method of self-compensation of a laser tracker in accordance with claim 19, wherein the proportionality constant is calculated by varying the temperature of the environment incident to said temperature sensors while said tracker makes repeated measurements of four retroreflective targets, wherein said targets are located in approximately the same horizontal plane, wherein two of said four retroreflective targets have an angular separation of approximately 90 degrees, and wherein two of said retroreflective targets are further from the laser tracker and have an angular separation of approximately 90 degrees.

21. A method of self-compensation of a laser tracker in accordance with claim 15, wherein said temperature corrected azimuth parameter indicates temperature induced change in the direction of the azimuth post, calculated by $\Delta AngX_{AZ\_POST}=k_{AZ\_POST\_X\_ANGLE}\cdot\Delta T_{AZ\_POST\_Y}$ and $\Delta AngY_{AZ\_POST}=k_{AZ\_POST\_Y\_ANGLE}\cdot\Delta T_{AZ\_POST\_X}$, wherein the representative temperature differences between the two sides of the azimuth post in the X and Y directions are $\Delta T_{AZ\_POST\_X}$ and $\Delta T_{AZ\_POST\_Y}$, and wherein k is a proportionality constant.

22. A method of self-compensation of a laser tracker, comprising:
    calculating or recording an axis non-squareness parameter within a first time period;
    calculating or recording temperature data from at least two temperature sensors provided within or on separate portion of yoke within said laser tracker within said first time period;
    calculating or recording temperature data from said at least two temperature sensors within a second time period; and
    calculating a temperature corrected value of said axis non-squareness parameter based on a comparison of temperature data from said first time period and said second time period.

23. A method of self-compensation of a laser tracker in accordance with claim 22, wherein said temperature sensors are located on opposite ends of the laser tracker yoke.

24. A method of self-compensation of a laser tracker in accordance with claim 22, comprising calculating a proportionality constant for said temperature correction by varying the temperature across that portion of the yoke that contains the temperature sensors while simultaneously measuring said axis non-squareness parameter.

25. A method of self-compensation of a laser tracker in accordance with claim 24, wherein the axis non-squareness parameter is determined by making frontsight and backsight measurements of azimuth angle, zenith angle and distance of at least two retroreflectors at different zenith angles or of at least two mirrors at different zenith angles.

26. A method of self-compensation of a laser tracker in accordance with claim 24, wherein said temperature corrected parameter indicates the temperature induced deviation from perpendicularity of the zenith and azimuth axes according to the following: $\Delta AXNS=h_{AXNS}\cdot\Delta T_{ZE\_AXIS}$, wherein k is the proportionality constant.

27. A method of self-compensation of a laser tracker, comprising:
calculating or recording an R0 parameter within a first time period;
calculating or recording temperature data from at least one temperature sensor provided within or on a portion of said laser tracker such that the measured temperature is representative of the temperature of the path between the gimbal point of the laser tracker and at least one home point within said first time period;
calculating or recording temperature data from said at least one temperature sensor within a second time period; and
calculating a temperature corrected value of said R0 parameter based on a comparison of temperature data from said first time period and said second time period.

28. A method of self-compensation of a laser tracker in accordance with claim 27, wherein the change in the R0 parameter is calculated according to $\Delta R0 = k_{R0} \cdot \Delta T_{R0}$ and wherein k is a proportionality constant.

29. A method of self-compensation of a laser tracker in accordance with claim 27, wherein the proportionality constant is calculated by placing said laser tracking in said home position and monitoring the change in distance to the home point as a function of temperature.

30. A self-compensating laser tracker that emits a laser beam, comprising:
a rotatable payload from which the laser beam is emitted;
at least two embedded, non-moveable, reflecting members provided on a support for the payload;
wherein one of said at least two reflecting members is a cube corner retroreflector and a second of said at least two reflecting members is a mirror;
at least one temperature sensor provided within or on said laser source or support and;
wherein the cube corner retroreflector and the mirror are fixed in position on the support relative to the rotatable payload and relative to each other and are structured to reflect the laser beam in a frontsight mode and a backsight mode when the payload is rotated accordingly in order to determine and then self-compensate for deviations in desired payload parameters where the payload parameters describe position and orientation of the laser beam.

31. A self-compensating laser tracker in accordance with claim 30, wherein said support comprises a gimbaled mechanism.

32. A self-compensating laser tracker in accordance with claim 30, wherein said gimbaled mechanism produces motion in the azimuth and zenith directions.

* * * * *